United States Patent

[11] 3,634,194

[72] Inventors John W. Frankenfeld
 Atlantic Highlands, N.J.;
 Bruce L. Dasinger, Niantic, Conn.
[21] Appl. No. 881,642
[22] Filed Dec. 3, 1969
[45] Patented Jan. 11, 1972
[73] Assignee Esso Research and Engineering Company

[54] FERMENTATION PROCESS FOR THE PRODUCTION OF HIGH-QUALITY PROTEIN CELLS AND NUCLEIC ACIDS
 10 Claims, 1 Drawing Fig.
[52] U.S. Cl. .................................................. 195/28 N,
 195/1, 195/3, 260/211.5
[51] Int. Cl. ............................................................ C12d 13/06
[50] Field of Search ........................................... 195/28 N,
 3, 3 H, 1; 260/211.5

[56] References Cited
UNITED STATES PATENTS
3,427,223 2/1969 Frankenfeld et al. .......... 195/1

Primary Examiner—Alvin E. Tanenholtz
Attorneys—Manahan and Wright and William O. Heilman ABSTRACT: Fermentation process for the production of high-quality protein cells from petroleum hydrocarbons and oxygenated hydrocarbons using a particular technique for the coagulation of the produced cells. Very desirable acids for use in the present process are selected from the group consisting of perchloric acid and trichloroacetic acid. These acids are unique in that they serve the dual purpose of coagulating the cells and removing the nucleic acids contained therein.

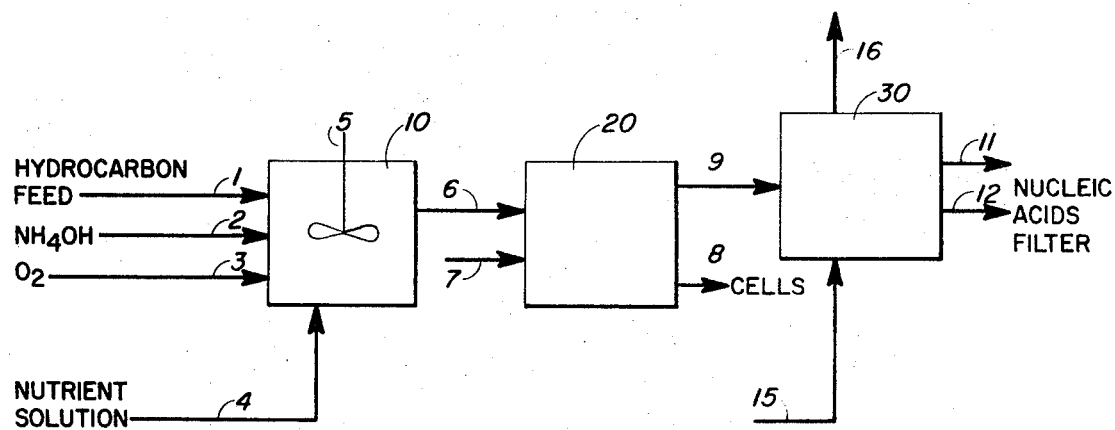

FERMENTATION PROCESS FOR THE PRODUCTION OF HIGH-QUALITY PROTEIN CELLS AND NUCLEIC ACIDS

The present invention is concerned broadly with a fermentation process for the production of high-quality protein cells and nucleic acids utilizing a micro-organism and a petroleum hydrocarbon or oxygenated petroleum hydrocarbon as the source of carbon for the production of the cells and the nucleic acids. Preferred acids for the present process are selected from the class consisting of perchloric acid and trichloroacetic acid.

Thus, the present invention is broadly concerned with a biosynthesis fermentation process. More particularly, the invention is concerned with the use of a petroleum hydrocarbon or an oxygenated petroleum hydrocarbon, particularly water-soluble, oxygenated hydrocarbons as the primary source of carbon in the fermentation process. In accordance with a specific adaptation of the present invention, hydrocarbon fractions, such as petroleum liquids, are used as such or are oxidized, or partially oxidized, and then contacted with a micro-organism under fermentation conditions to produce high yields of protein. The fermentation process may be carried out continuously or batchwise. The fermentation broth from the fermentation stage or initial stage containing the cells is introduced into a coagulation stage wherein the cells are coagulated using a particular acid wherein the nucleic acids are separated from the coagulated cells and are in the supernatant phase. This phase is then withdrawn and handled to recover the nucleic acids which are useful, for example, as flavoring agents and other industrial applications. Also, by removing these nucleic acids the protein value of the cells is enhanced.

The biosynthetic process of the present invention is applicable to the biosynthesis of all micro-organism which are capable of growth on petroleum hydrocarbon and oxygenated hydrocarbon substrates, particularly those oxygenated substrates derived from petroleum hydrocarbon fractions.

One micro-organism which is suitable for the present invention is *Micrococcus cerificans* (ATCC No. 14987) which was isolated and identified by Dr. R. E. Kallio et al., JOURNAL OF BACTERIOLOGY, Vol. 78, No. 3, pages 441–448 Sept. 1959). Further identification as follows:

Morphology

Cells are small, spherical, tending to be elliptical in old cultures and media high in nitrogen.

Cells from defined media average 0.5 to 1.0 microns in diameter, and from complex media cell diameters average 1.0 to 2.0 microns. Cells occur singly or in clumps. Immotile, metachromatic granules and pseudanophilic granules are not observed.

Gram reaction

Negative.

Colonies on defined agar are small (1 mm.), circular convex, having entire edge. Colonies on nutrient agar are larger (2 to 5 mm.), raised mucoid, generally round.

Within a species there can be many different strains comprising variations and both natural and induced mutants.

The morphology and growth reaction characteristics of other organisms listed above are given in U.S. Pat. No. 3,308,035 issued on Mar. 7, 1967, entitled, "Process for Producing a High Protein Composition by Cultivating Micro-organisms on an N-Aliphatic Hydrocarbon Feed," inventor John D. Douros, Jr.

The process of the present invention may be readily understood by reference to the diagrammatical flowplan illustrating one embodiment of the same. Referring specifically to the drawing, a hydrocarbon feed or oxygenated hydrocarbon feed is introduced into an initial reaction zone or fermentation zone 10 by means of line 1. A nitrogen source such as ammonium hydroxide is introduced by means of line 2 while oxygen is introduced by means of line 3. A nutrient solution is introduced by means of line 4 and suitable mixing secured by means of mixing means 5. At the end of a predetermined time period the fermentation broth containing the protein cells is withdrawn from initial zone 10 by means of line 6 and introduced into a coagulation zone 20.

The fermentation process is an aerobic process and the growth medium comprises an aqueous mineral salt medium and excess oxygen. The fermentation process is one similar to that described in U.S. Pat. No. 3,414,477, Dec. 3, 1968, entitled, "Biosyntheses of Protein from Hydrocarbons Using an Antibiotic," inventors Douros et al., or similar to that described in U.S. Pat. No. 3,384,491, May 21, 1968, entitled, "Process for Producing High Protein Feed Supplements from Hydrocarbons," inventors Guenther et al.

A very satisfactory substrate or medium is prepared as follows:

The foregoing $P_1$ medium has a pH of 7.8. A variation of the above is one in which phosphate is supplied in the form of phosphoric acid.

The temperature of the biosynthesis bath may be varied between about 20° and about 55° C. depending upon the specific micro-organism being grown; but preferred temperatures are between about 25° and about 45° C., such as about 35° C. The pH is preferably in the range from 5.5 to 8.5 such as about 7.0.

Hydrocarbon feeds which can be utilized for the present process are $C_1$ to $C_{30}$ petroleum hydrocarbon feeds, preferably low boiling hydrocarbon such as $C_{12}$ to $C_{20}$. A preferred feed is one which contains a substantial weight percentage, e.g., 70+ weight percent, of normal (straight chain) paraffin hydrocarbons.

The broth from fermentation zone 10 is removed by means of line 6 and introduced into coagulation zone 20. An acid selected from the class of perchloric acid (PCA) and trichloroacetic (TCA) acid is introduced by means of line 7. The amount of acid introduced is sufficient to lower the pH of the broth to from about 2 to 4.5 such as about 3.5. By using these acids to secure the pH specified, a marked improvement in accelerating product recovery is secured. The microbial cells are rapidly coagulated prior to separating them from the product containing effluent stream. According to certain preferred embodiments of this invention, the rate at which the microbial cells are separated from the remainder of the product stream is accelerated by as much as 20-fold or even higher, thus attaining substantial economies in time and equipment necessary for conducting the separation procedure on a given volume of product stream. In addition these acids cause the nucleic acids to separate in the supernatant liquid thus enhancing the protein value of the coagulated cells.

After addition of the acid, the acidified effluent is preferably heated. The heating is conducted at a temperature above the growth temperature maintained in the biosynthesis bath yet below the temperature at which cell degradation occurs (protein degradation). Temperatures can be used which cause protein denaturation as long as no degradation of food value occurs. The heating is continued for a sufficient period of time to attain substantial coagulation of cells and removal of nucleic acids.

In order to avoid degradation of cells during the coagulation step, the temperatures to which the acidified effluent is heated are usually controlled to range from a temperature about 10° C. above the growth temperature maintained in the biosynthesis bath up to a temperature below that at which cell degradation occurs, e.g., a temperature of approximately 100° C. or even below. The exact upper and lower temperatures will vary depending upon the specific micro-organism being grown. Usually, the acidified effluent is heated to a temperature ranging from about 45° to about 90° C. for a time period ranging from 1 to 30 minutes, and more preferably from about 1 to 20 minutes such as about 10 minutes. For example, heating times of 1 to 15 minutes, such as about 10 minutes, at temperatures ranging from about 50° to about 85° C., such as about 65° yield excellent coagulations for bacterial cells, including *Micrococcus cerificans* and is sufficient for removal of nucleic acids.

High-quality protein cells are separated by any suitable means and are withdrawn from coagulation zone 20 by means of line 8 and handled in any manner desirable. They may be dried by known techniques. As mentioned, these cells are free of nucleic acids and thus represent a very high quality protein product.

The supernatant liquid containing the nucleic acids is removed from coagulation zone 20 by means of line 9 and passed to nucleic acid recovery zone 30. In zone 30 the supernatant liquid is treated in a suitable manner in order to recover the nucleic acid. The method of treatment will depend on the reaction conditions and on the particular acid used to secure coagulation of the cells. If trichloroacetic acid is used the supernatant liquid in zone 30 is contacted with an organic solvent such as hexane, which is introduced by means of line 15. This solvent dissolves the trichloroacetic acid and precipitates the nucleic acids. The solvent mixture is withdrawn by means of line 16 and handled in a manner to separate the organic solvent, such as hexane and the trichloroacetic acid, which reagents are recycled to the system. Suitable organic solvents are hexane, pentane, octane, low-boiling petroleum fraction ethers or other solvents such as diethyl ether and the like. The nucleic acids are removed by means of line 12 and handled in any manner to purify the same.

If perchloric acid is used, the supernatant liquid in zone 30 is neutralized to a pH of about 7 by the addition of a base such as sodium hydroxide which is introduced by means of line 15. The solution is then concentrated until the nucleic acids are precipitated which acids are removed by means of line 12 and preferably purified by washing with water. The residue liquid, which contains some essential cell growth nutrients, is preferably recycled to fermentation zone 10.

In order to further illustrate the invention the following example is given.

EXAMPLE 1

A fermentation process was conducted using a petroleum hydrocarbon feed containing from about 12 to 20 carbon atoms. The temperature in the fermentation balance was about 35° C. and the pH about 7.0. A nutrient solution as set forth was utilized. The micro-organism utilized was *Micrococcus cerificans*.

Three 5-cc. portions of the broth were removed from the fermentation zone. The cells from each sample were removed by centrifugation, washed with water and resuspended in 5 cc. of distilled water. The three samples were treated as follows.

Sample 1 was not further treated and was used as a control.

Sample 2 was acidified to pH 4.0 by addition of HCL. The volume was adjusted to 10.0 cc. and the sample was heated at 65° C. for 10 minutes. After cooling the cells were removed by centrifugation and the ultraviolet absorbance of the supernatant by measured at 260 m$\mu$, the typical wavelength for nucleic acids (reference 1). The absorbance at this wavelength is a measure of the amount of nucleic acids extracted into the supernatant.

Sample 3 was treated in the same manner as sample 2 except that 5.0 cc. of 0.5 N PCA was added in place of the HCL. In addition, both the supernatant of sample 3 and the residual cells after removal of the supernatant were analyzed as described by Lowry (reference 2) for protein content. This was done in order to determine the amount of protein lost by PCA extraction.

The results of these experiments are shown in table 1. It is apparent that treatment with PCA and heating is very effective in removing nucleic acids while addition of HCl plus heating is not. In sample 3 (PCA + heat) 95 percent of the nucleic acids were removed while in sample 2 (HCL + heat) only 13 percent were extracted. In addition, during PCA treatment only 2.4 percent of the cell protein was lost.

Reference (1) *Studies of Biosynthesis in Eschericia Coli*, Carnegie Institute of Washington Publication 607 (1955).

Reference (2) O. H. Lowry et al., J. Biol. Chem., 193, 265 (1951)

Table I

Effectiveness of Perchloric Acid in

| Sample | Removing Nucleic Acid from Cells Treatment | Nucleic Acids Removed | | Protein Lost |
|---|---|---|---|---|
| | | µg./mg. cells | % | % |
| 1 | None | 2.3 | | ND* |
| 2 | HCl + Heat | 15.8 | 13 | ND* |
| 3 | PCA + Heat | 118.0 | 95 | 2.4 |

* ND = "Not determined."

What is claimed is:

1. Biosynthesis process for the production and recovery of protein-containing microbial cells and nucleic acids which comprises growing micro-organism cells in an aqueous biosynthesis bath containing an inoculant of said micro-organism cells, petroleum hydrocarbon or an oxygenated petroleum hydrocarbon, nitrogen, oxygen and essential cell nutrients; withdrawing an aqueous effluent containing microbial cells which are rich in protein and nucleic acids, adding to said aqueous effluent a material selected from the class consisting of perchloric acid and trichloroacetic acid in sufficient amount to lower the pH of said effluent to a pH in the range of about 2.0 to 4.5, heating said aqueous effluent to a temperature above the cell growth temperature but below that at which significant protein degradation occurs for a sufficient period of time to substantially coagulate said cells, separating said cells from said effluent to yield a protein-containing cell component and a residuum containing nucleic acids and separating said nucleic acids from said residuum.

2. A process according to claim 1 wherein said micro-organism cells comprise *Micrococcus cerificans*.

3. Process as defined by claim 1 wherein the effluent is heated to a temperature in the range from about 45° to about 90° C. for a period in the range from about 1 to 20 minutes.

4. Process as defined by claim 3 wherein the pH is lowered to about 3.5, wherein the temperature is raised to about 65° C. and wherein the time period is about 10 minutes.

5. Process as defined by claim 1 wherein said acid comprises trichloroacetic acid and wherein said effluent is contacted with an organic solvent to dissolve said trichloroacetic acid, whereby said nucleic acids precipitate and are recovered.

6. Process as defined by claim 1 wherein said acid comprises perchloric acid and wherein said effluent is contacted with a base solution to neutralize the same whereby said nucleic acids precipitate and are recovered.

7. A continuous process for the biosynthesis and recovery of protein-rich microbial cells and nucleic acids which comprises continuously producing micro-organism cells is an aqueous biosynthesis bath comprising an inoculant of micro-organism cells, a source of both carbon and hydrogen and separate sources of oxygen and essential cell nutrients; continuously withdrawing an aqueous effluent containing product microbial cells from said biosynthesis bath, adding to said aqueous effluent a material selected from the class consisting of perchloric and trichloroacetic acid in sufficient amount to lower the pH of said effluent to a pH ranging from 2 to 4.5, thereafter heating said acidified effluent at a temperature ranging from about 45° to about 90° C. but below that at which significant protein degradation occurs for a sufficient period of time to substantially coagulate said cells, separating said cells, from said effluent to yield a cell component and a residuum containing nucleic acids, separating said nucleic acids from said residuum and returning the nutrient containing residuum to said biosynthesis bath.

8. Process as defined by claim 7 wherein said micro-organism cells comprise *Micrococcus cerificans*.

9. Process as defined by claim 8 wherein said acid comprises trichloroacetic acid and wherein said nucleic acids are separated from said residuum by treating said residuum with an organic solvent to dissolve said trichloroacetic acid thereby precipitating said nucleic acids.

10. Process as defined by claim 8 wherein said acids comprise perchloric acid and wherein said residuum is contacted with sodium hydroxide whereby said nucleic acids are precipitated are recovered.

* * * * *